United States Patent [19]

Yang

[11] Patent Number: 4,774,048

[45] Date of Patent: Sep. 27, 1988

[54] MODULAR TOKAMAK MAGNETIC SYSTEM

[75] Inventor: Tien-Fang Yang, Wayland, Mass.

[73] Assignee: The United States of America as represented by the United States Department of Energy, Washington, D.C.

[21] Appl. No.: 932,560

[22] Filed: Nov. 20, 1986

[51] Int. Cl.$^4$ .............................................. G21B 1/00
[52] U.S. Cl. .................................................... 376/142
[58] Field of Search ................. 376/133, 142; 336/195

[56] References Cited

U.S. PATENT DOCUMENTS

| | | | |
|---|---|---|---|
| 3,786,338 | 1/1974 | Gilbert | 336/195 |
| 4,087,322 | 5/1978 | Marcus | 376/142 |
| 4,116,264 | 9/1978 | Farfaletti-Casali | 376/142 |
| 4,263,096 | 4/1981 | Ohkawa et al. | 376/142 |
| 4,367,193 | 1/1983 | Bussard | 376/133 |
| 4,370,295 | 1/1983 | Bussard | 376/142 |
| 4,616,205 | 10/1986 | Praught et al. | 336/195 |

OTHER PUBLICATIONS

Bateman, "Ripple Reduction Poloidal Field Coils for Tokamk Fusion Reactors,"9th Symp. of Eng. Prob. of Fus. Res. Oct. 1981.

Primary Examiner—Deborah L. Kyle
Assistant Examiner—Richard L. Klein
Attorney, Agent, or Firm—Gustavo Siller, Jr.; John M. Albrecht; Judson R. Hightower

[57] ABSTRACT

A modular tokamak system comprised of a plurality of interlocking moldules. Each module is comprised of a vacuum vessel section, a toroidal field coil, moldular saddle coils which generate a poloidal magnetic field and ohmic heating coils.

17 Claims, 12 Drawing Sheets

MODULAR TOKAMAK MAGNETIC SYSTEM

CONTRACTUAL ORIGIN OF THE INVENTION

The U. S. Government has rights to this invention under Contract No. DE-AC02-78ET51013 between Massachusetts Institute of Technology and the U.S. Department of Energy.

BACKGROUND OF THE INVENTION

This invention relates generally to a tokamak reactor system and more particularly to a modular tokamak magnetic system.

The magnetic system of a tokamak fusion reactor consists of toroidal magnetic field (TF) coils, poloidal magnetic field (PF) coils, and ohmic heating (OH) coils. Generally, there are two approaches in designing tokamak reactor magnetic coil systems. One approach is to place the PF and OH coils inside the TF coil bore. The other approach is to place the PF coil outside the TF coils and the OH coils in the central core.

In the first approach, the PF and OH coils are in close proximity to the plasma, minimizing the current required in these coils. The disadvantage to such a system is that the PF and OH interlock with the TF coil. This interlocked coil design poses a difficult maintenance problem for superconducting systems. The maintenance problem is so extreme that the second approach is usually considered in most reactor designs. The second approach however, poses different kinds of problems. First, the PF coils are far away from the plasma. Thus, a very large current is required in the PF coils to shape and control the plasma equilibrium configuration. Second, for small aspect ratio tokamaks, the central core space is very limited, necessitating a vary large current in the OH coil to produce a reasonable flux swing. Thus, the total energy stored in the PF and OH systems would be in the multigigajoule range for a typical power reactor. A further disadvantage to this design is the large overturning moment generated by the large current in the PF coils. Generally, the advantages and disadvantages of each approach are summarized below in Table 1.

TABLE 1

Comparison of the Advantages and Disadvantages of External and Internal PF and OH Coil Systems

|  | Current | Plasma Control | Overturning Moment | Maintenance |
|---|---|---|---|---|
| Internal PF Coils | low | good | low | poor |
| External PF Coils | high | poor | high | good |
| Internal OH Coils | low | — | low | poor |
| External OH Coils | high | — | high | good |

It is clear that the only drawback of an internal system is the problem of maintenance. Finding a solution to this problem would make the internal system a very attractive approach. For a copper device, the TF coil can be made into many sections if plate construction is used. However, the maintenance problem is still difficult if the sections are joined by bolts. This problem can be resolved by using pressure joints with locking rings and keys, as disclosed by Yang, et al., Fusion Technol 8, 838 (1985). The OH and PF coils can now be located inside the TF bore. Maintenance of these coils and the vacuum vessel can be accomplished by lifting the entire top conductor of the TF coils. Such a design makes maintenance of all internal parts possible, however, it is not a simple task to lift and reassemble the entire top. Also, at present there is no known method of making joints for superconductors. This kind of segmentation method for superconducting magnets will not be available in the foreseeable future. Therefore, making superconducting PF magnets utilizing the segmentation method and pressure joints is not feasible.

In order to make the internal PF and OH systems maintainable, it is essential to find a modular system for the PF and OH coils.

Therefore in view of the above, it is an object of the present invention to provide a tokamak system which can be easily maintained.

It is another object of the present invention to provide a tokamak system which minimizes the current needed to shape and control the plasma equilibrium configuration while remaining easy to maintain.

It is another object of the present invention to provide a modular OH coil system for a tokamak.

It is a further object of the present invention to provide a modular PF system for a tokamak.

It is still another object of the present invention to provide a tokamak reactor consisting of interlocking modules.

Additional objects, advantages and novel features of the invention will be set forth, in part, in the description which follows, and in part will become apparent to those skilled in the art upon examination of the following or may be learned by practice of the invention. The objects and advantages of the invention may be realized and attained by means of the instrumentalities and combinations, particularly pointed out in the appended claims.

SUMMARY OF THE INVENTION

To achieve the foregoing and other objects and in accordance with the purposes of the present invention, as embodied and broadly described herein, the modular tokamak system of this invention may comprise a plurality of interlocking modules. Each module comprises a vacuum vessel section, a toroidal field coil disposed around the vacuum vessel section, modular saddle coils which generate a poloidal confining magnetic field and ohmic heating coils.

BRIEF DESCRIPTION OF THE DRAWINGS

FIG. 10(b) illustrates the plasma confinement with an internal PF coil system with external return conductors.

DETAILED DESCRIPTION OF THE INVENTION

Reference will now be made in detail to the present preferred embodiments of the invention, examples of which are illustrated in the accompanying drawings.

Figure 1:
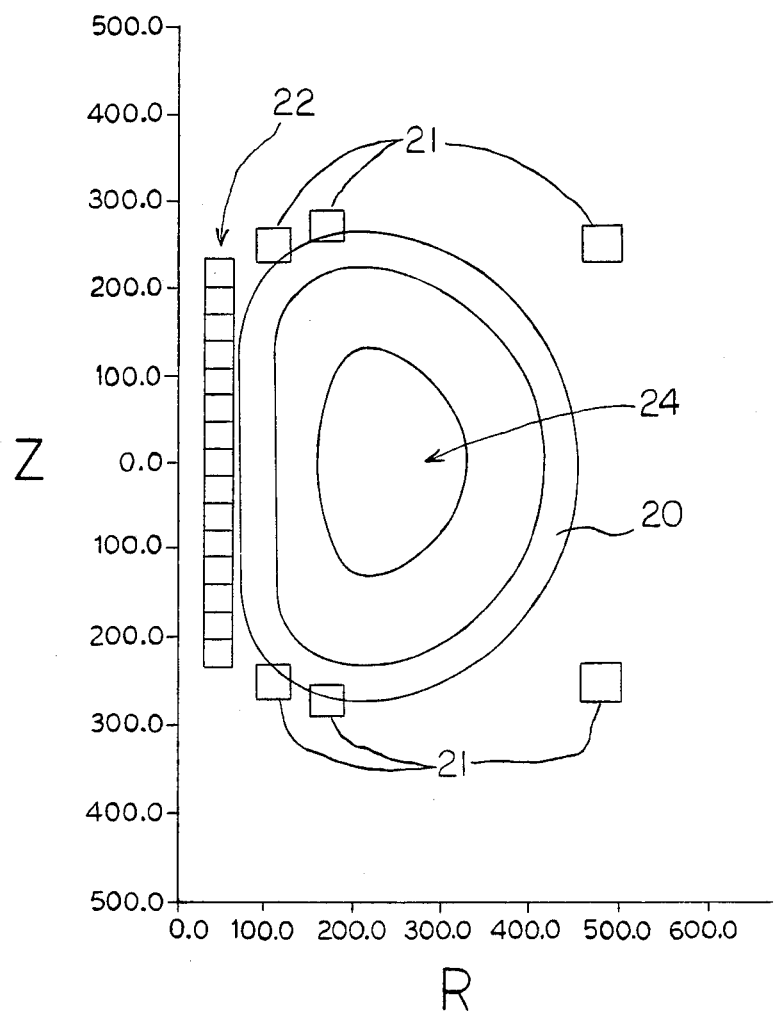
FIG. 1 illustrates the plasma configuration for conventional OH and PF coils with a D-shaped TF coil.

As illustrated in FIG. 1, a typical tokamak reactor uses TF coils 20 which are D-shaped superconducting magnets. For purposes of illustration, the parameters of the proposed TFCX Lite-R1 reactor with D-shaped TF coils will be used as a model. The parameters for Lite-R1 are listed below in Table 2. It will become readily apparent to those skilled in the art that the present invention may also be used in a reactor having other typical TF coil designs, such as bean-shaped or window frame designs.

TABLE 2

Plasma Parameters for the TFCX LITE-R1 Device

| | |
|---|---|
| $B_o$ = | 6.1 T Moderate |
| $I_p$ = | 8.11 MA |
| $R_o$ = | 2.44 m |
| a = | .84 |
| q = | 3.5 |
| = | 5% |
| V-S = | 12.6 |
| Fusion power = | 600 MW |

Figure 2:
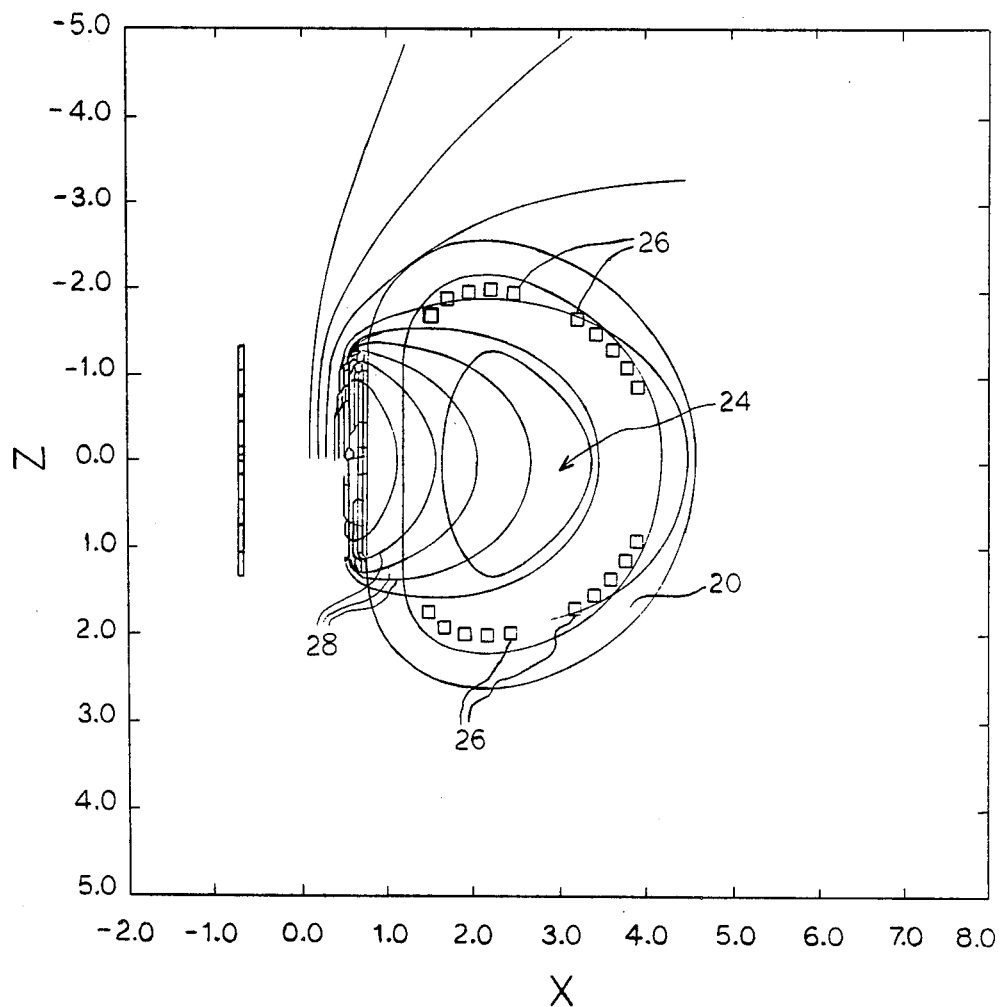
FIG. 2 illustrates the flux lines of a central solenoidal OH coil.

The OH coil 22 for Lite-R1 is in the central bore and requires 30 MA of current to produce 12.6 volt-sec. (A "volt-sec" here is defined as the voltage produced by the OH coils in the plasma multiplied by the duration of the pulse time.) The flux of the OH solenoide 22 is shown in FIG. 2. Some flux lines 28 are passing through the plasma 24. This reduces the effect of volt-sec and also distorts the plasma 24. Therefore, additional shaping coils 26 have to be added to compensate the effects of flux leakage.

Figure 3:
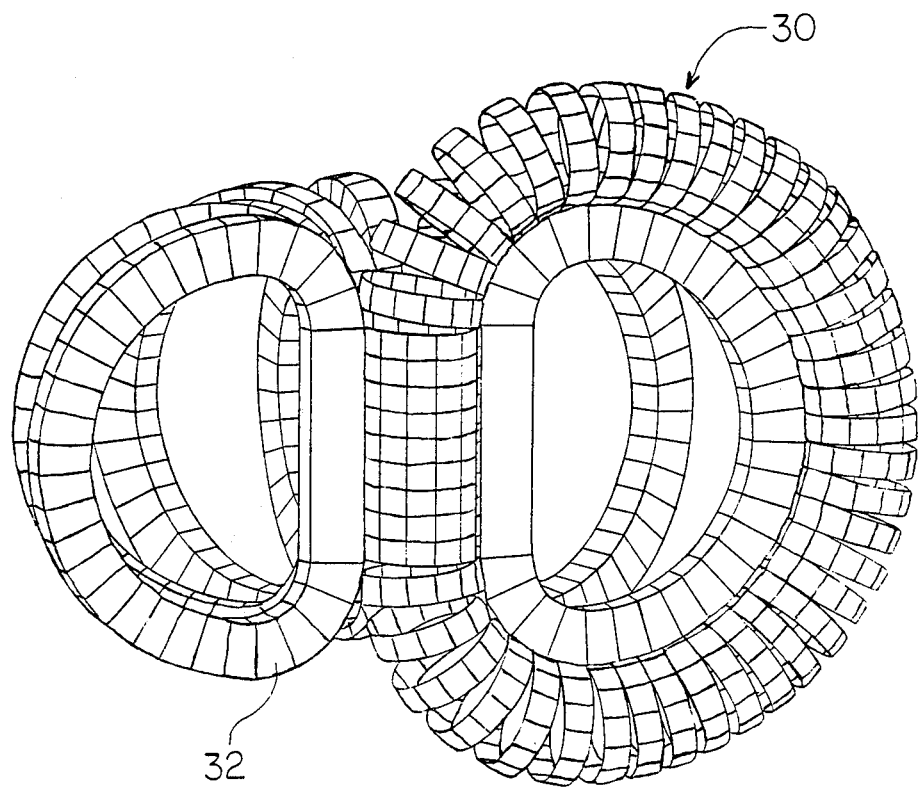
FIG. 3 is a perspective view of a vertically standing toroidal-type OH coil of the present invention.
Figure 4:
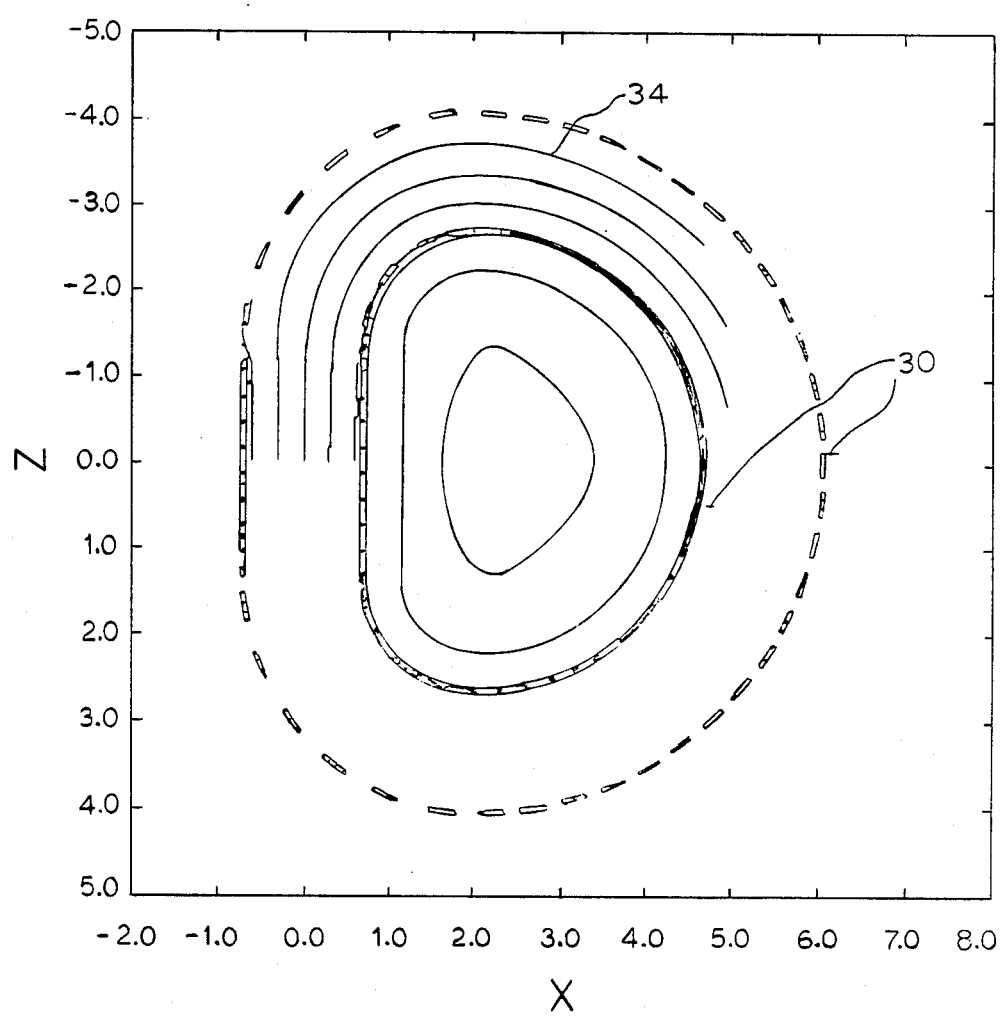
FIG. 4 illustrates the magnetic flux lines of the single vertically-standing toroidal-type OH coil illustrated in FIG. 3.

The ideal OH coil, which gives the least flux leakage, is an infinitely long solenoid, but it is not practical to use. Therefore, according to the invention a solenoid is shaped into a vertically standing toroidal-like coil 30 as illustrated in FIG. 3. OH coil 30 is disposed around a TF coil 32. Most of the flux lines 34 are confined inside the OH coil 30 bore and the leakage is very small as illustrated in FIG. 4. The advantages of this preferred embodiment are the increase in volt-sec and complete decoupling of OH and PF coils.

Figure 5:
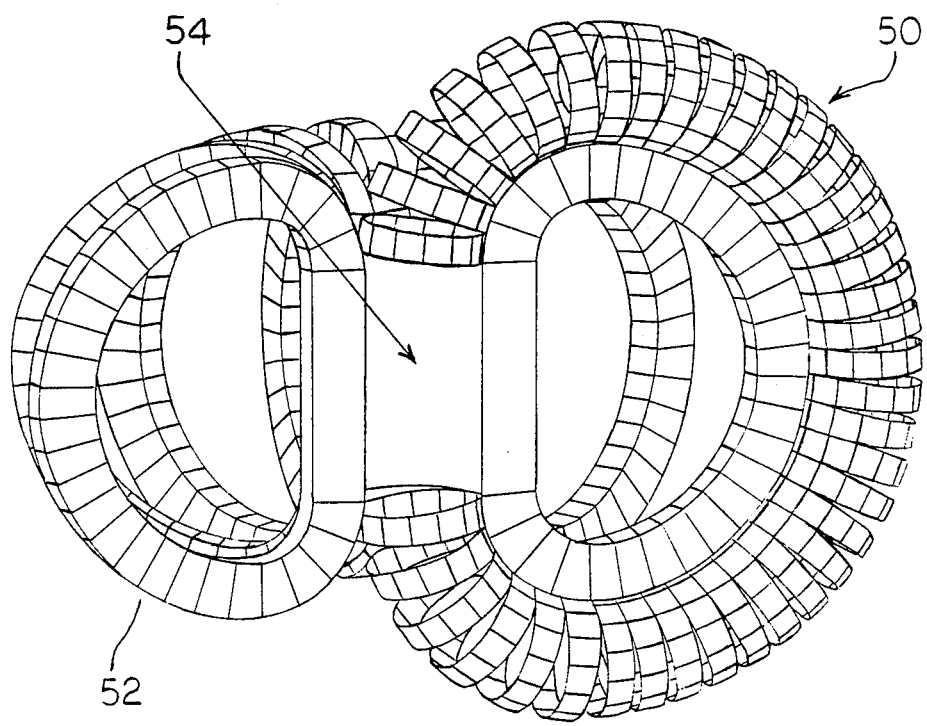
FIG. 5 is a prospective view of a horseshoe-type OH coil of the present invention.
Figure 6:
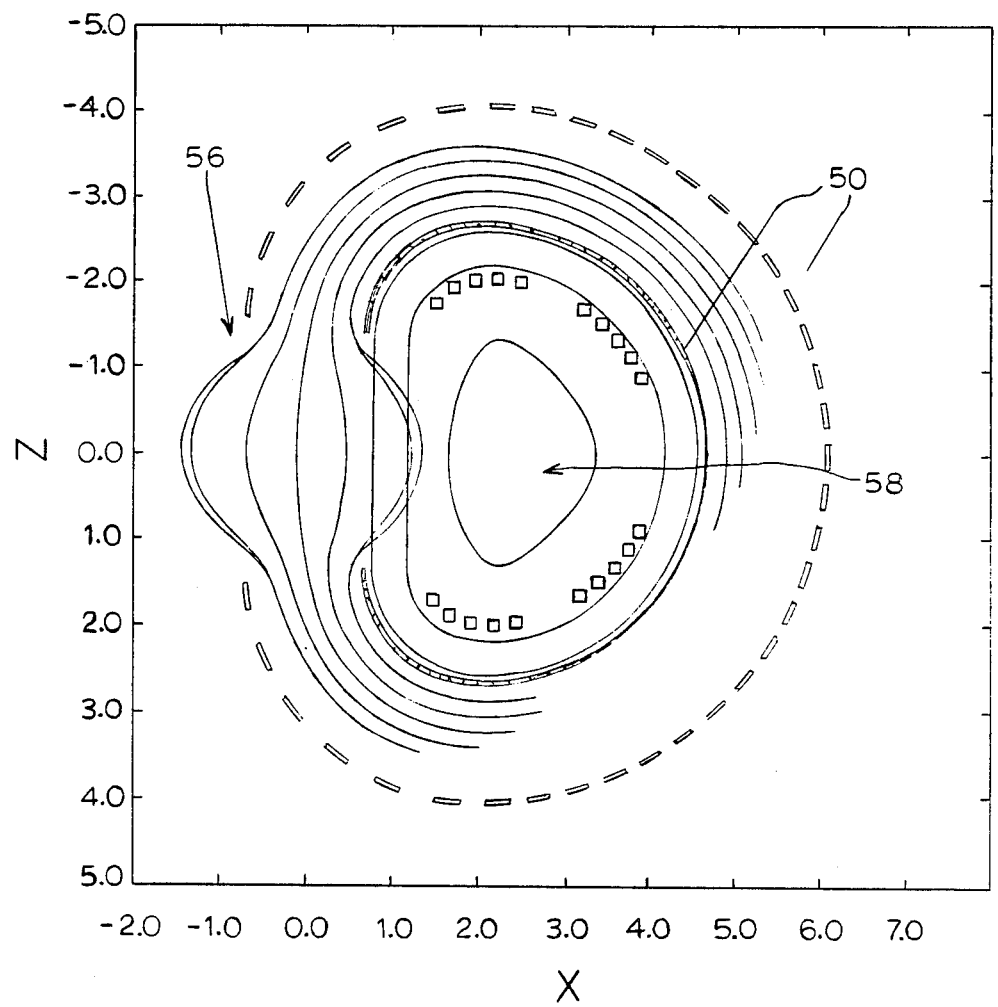
FIG. 6 illustrates the magnetic flux lines of a horseshoe-type OH coil of FIG. 5.

FIG. 5 illustrates another preferred embodiment of the present invention. The central bore of a vertically-standing OH coil is removed and OH coil 50 now resembles a horseshoe. Horseshoe-shaped OH coil 50 is disposed around a TF coil 52. The flux lines 56 generated by horseshoe-shaped OH coil 50 are no longer straight but bulge out radially at the mid-plane, as illustrated in FIG. 6. However, flux lines 56 are not passing through the plasma 58, therefore, the effective volt-sec is not reduced. The central bore space 54 now becomes available for other purposes.

Figure 7:
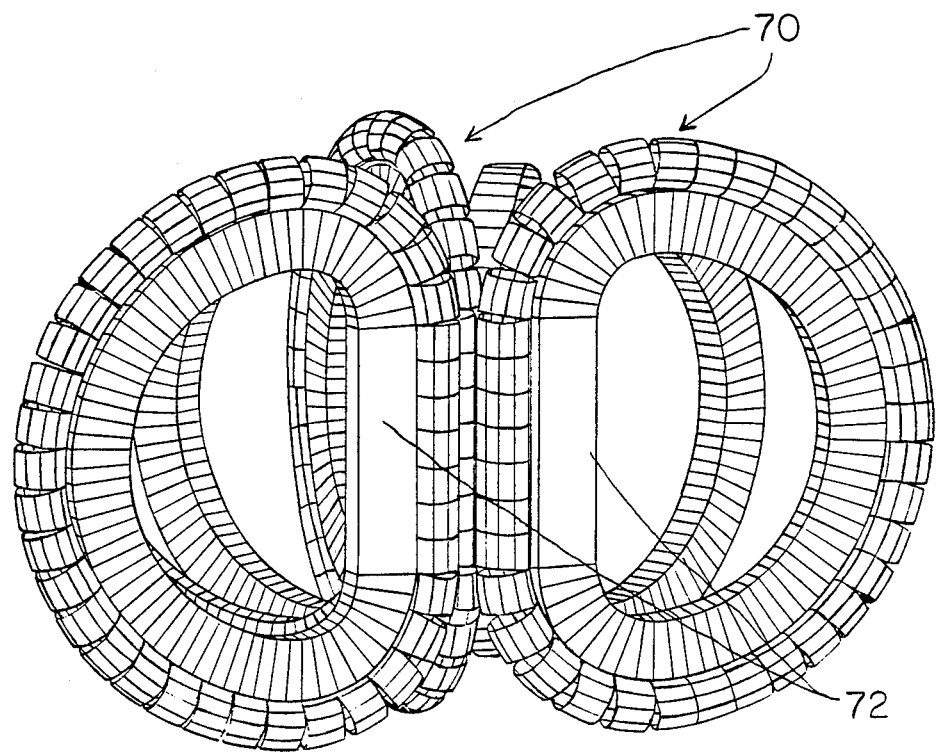
FIG. 7 is a prospective view of multiple, vertically-standing toroidal-typekOH coils.

One drawback for the two type of coils described above is that the minor radius of the coil is large which results in a bulky coil. To solve this problem, a preferred embodiment utilizes a multi-toroidal coil arrangement as illustrated in FIG. 7. The OH coil is no longer a single continuous winding in the poloidal direction. A plurality of vertically-standing toroidal-type coils 70 are disposed around PF coils 72. The size of each individual coil 70 is substantially reduced from the size of the OH coils embodied in FIGS. 3 and 5.

Figure 8:
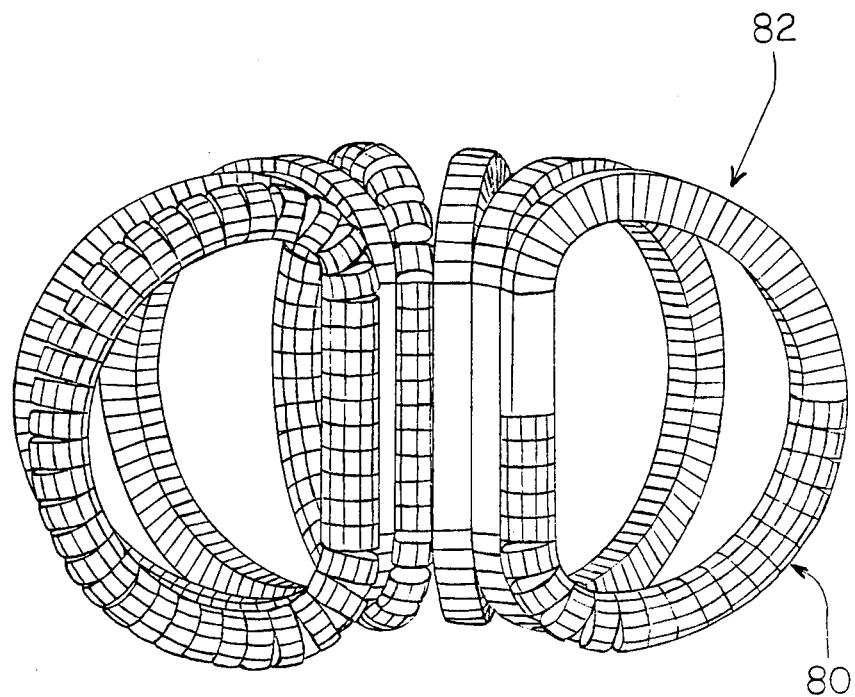
FIG. 8 is a prospective view of multiple, vertically-standing toroidal-type OH coils wrapped around the TF coils.

FIG. 8 illustrates another preferred embodiment of the present invention which comprises a multi-toroidal coil arrangement. OH coils 80 are wound around the TF coils 82, such that OH coils 80 envelope TF coils 82. The magnetic flux produced by this OH coil 80 is parallel to the current path in the TF coil winding, as shown in FIG. 4. The only space occupied by OH coil 80 is the conductor. The central core has now become vacant and can be used for TF coils, a bucking cylinder, or other suitable purposes. The TF coils 82 and OH coils 80 now form a single unit.

As discussed above, the plasma confining PF is conventionally generated by continuous PF coils which are external to the TF coils. An internal PF coil design, however, requires much less current than an external coil, since internal coils are in close proximity to the plasma. The major drawback is that the continuous internal PF coils and TF coils are then interlocked.

Figure 9:
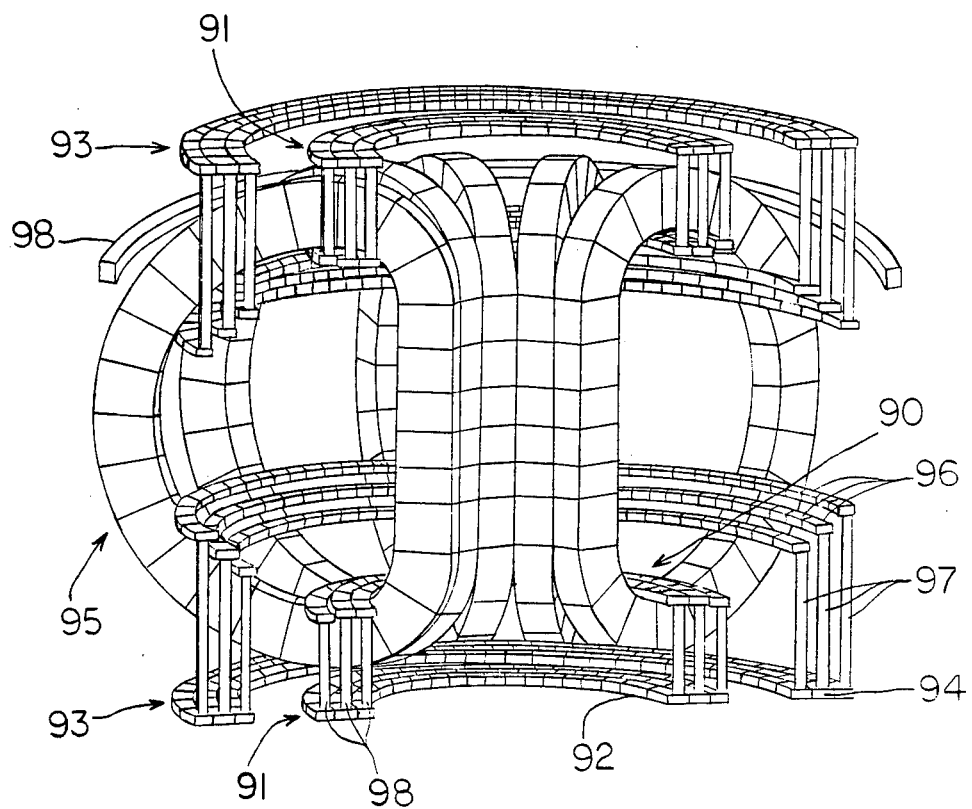
FIG. 9 is a prospective view of a modular, saddle-type PF coil of the present invention.

Illustrated in FIG. 9 is a modular saddle coil system which may be used as the PF coils. This preferred embodiment of the present invention is adopted for providing a modular tokamak design while providing PF coils which are internal to the TF coils.

The PF coil system is comprised of divertor-like and equilibrium field (EF) coils. Typically, these coils carry current opposite to each other. Saddle coil 93 is used as the divertor coil. Saddle coil 93 is comprised of internal coil 96 and a return coil 94 which are connected to each other by conductor 97. Return coil 94 is disposed at a distance from TF coil 95 and serves as a return conductor by carrying current in the opposite direction to that of internal coil 96. In a similar manner, saddle coil 91 serves as the EF coil and is comprised of internal coil 90 connecting conductor 98 and return coil 92.

Figure 10:
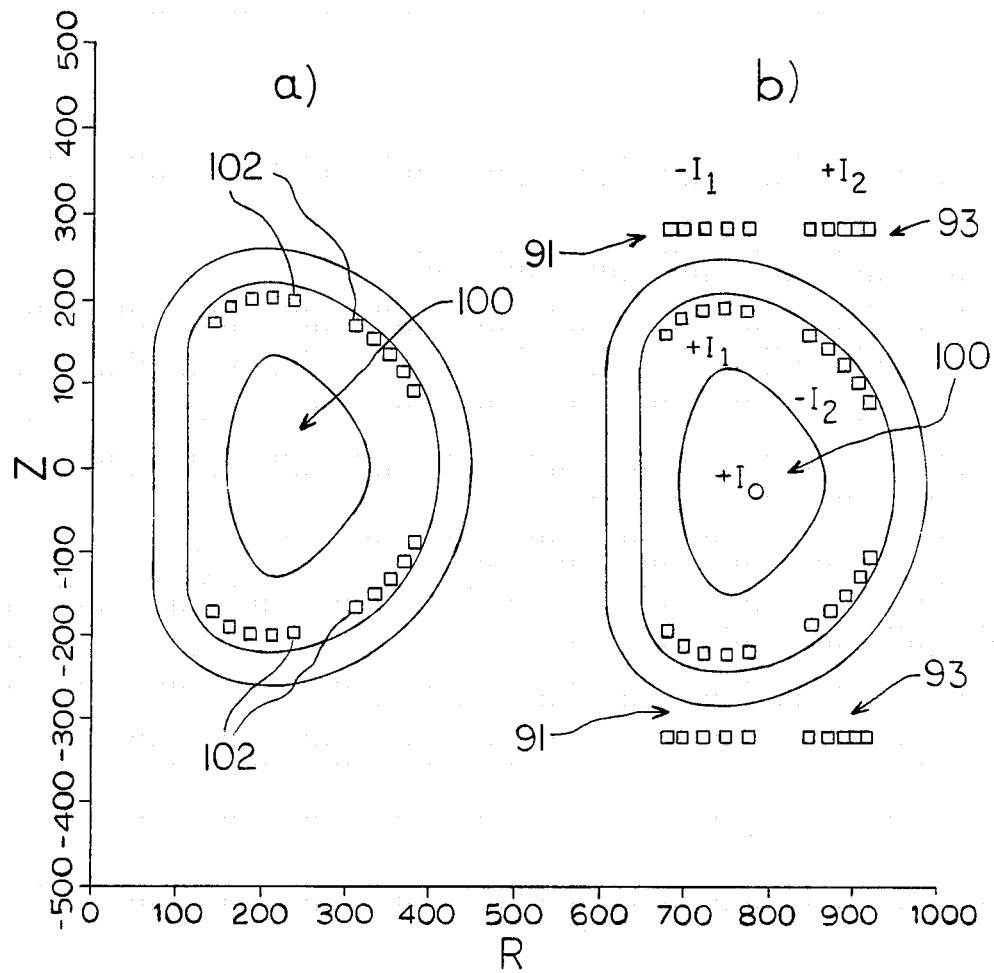
FIG. 10($a$) illustrates the plasma confinement with an internal PF coil system.

Since the return conductors of saddle coils 91 and 93 are far away from the plasma and have a very small net current, the effect on the plasma is minimal. FIG. 10(a) shows the shaping of plasma 100 using an all internal PF coil system 102. FIG. 10(b) shows the shaping of plasma 100 using saddle coils 91 and 93, each having internal PF coils with return conductors.

As illustrated in FIG. 9, a trimming coil 99 disposed outside the TF coil may be used with PF coils 91 and 93 to compensate for the non-vanished effects of the return conductors.

It will be readily apparent to those skilled in the art that although the preferred embodiment of the invention has been described with reference to saddle coils, any suitable loop coil arrangement, such as a window frame coil, may also be used.

Figure 11:
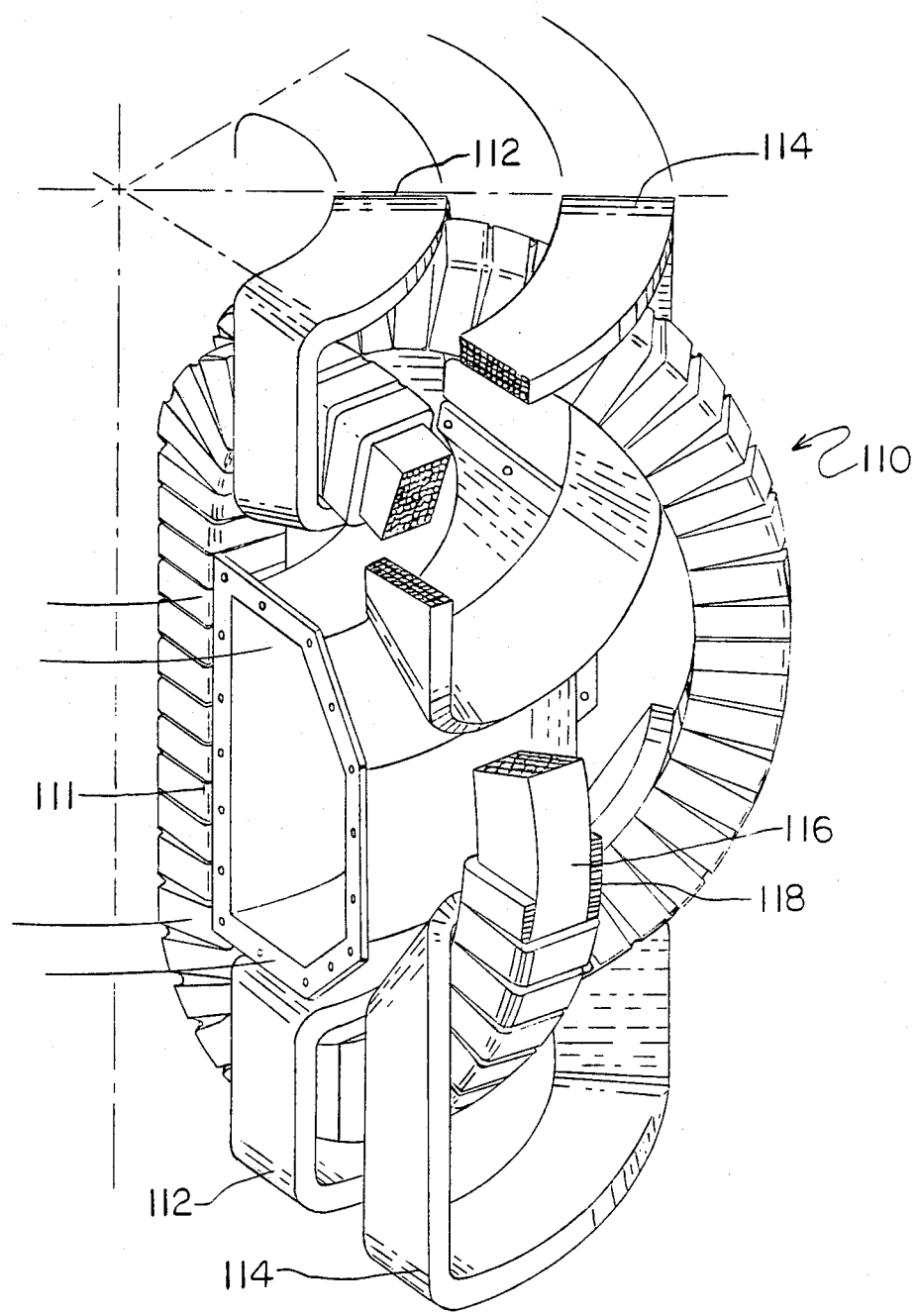
FIG. 11 illustrates a modular tokamak module of the present invention.
Figure 12:
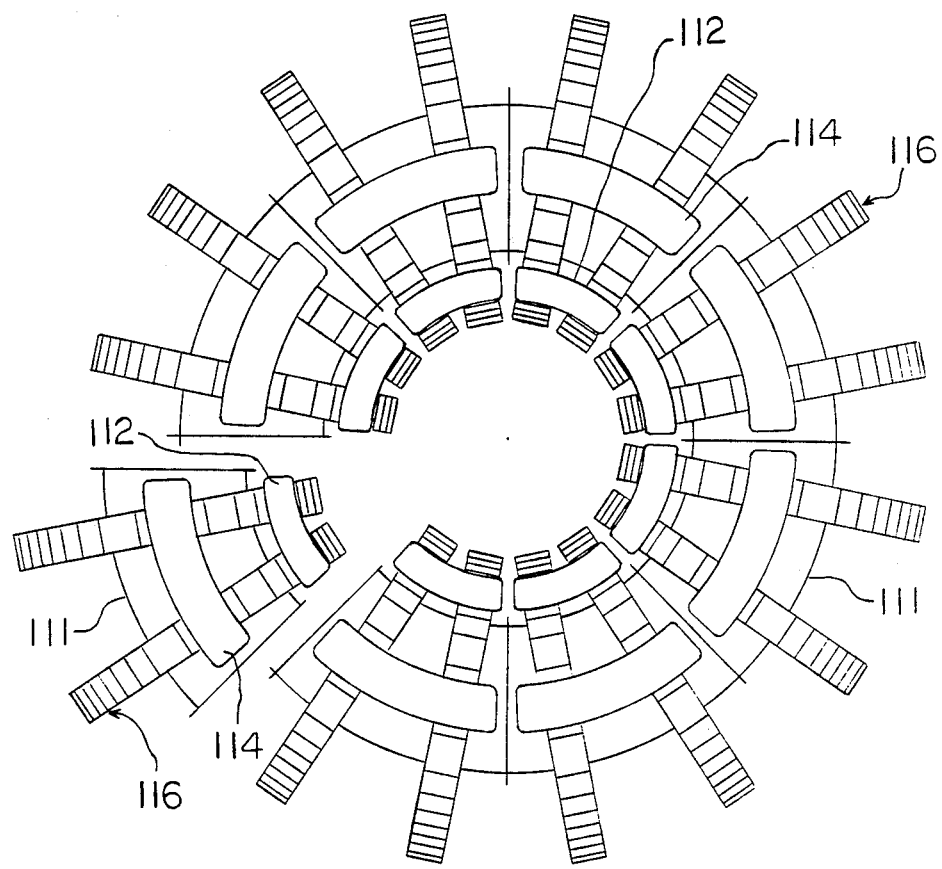
FIG. 12 is a top view of a modular tokamak system showing a detached module.

A modular magnetic sector can be made from combined OH and PF units of the embodiments of FIGS. 7 and 8 and a PF loop of the embodiment of FIG. 9. The OH coils embodied in FIG. 8, can provide the same amount of volt-sec as a straight solenoid in the central core, with much less current and field. The superconductor can be operated at a much higher current density and the space requirement is minimal. The embodiment of FIG. 9 provides a modular PF coil system with the PF coils disposed near the plasma. A module may contain one, or as many as half of the total of the OH-TF coil sets. There should be at least two 180° sectors, such that the system can be separated for maintenance. However, a two 180° sector system would still be too heavy and bulky to maneuver. A module constructed from a single OH-TF coil set, would result in too many modules. Preferably, the modular unit would contain two OH-TF coils as illustrated in FIG. 11. Each module 110 contains a vacuum vessel 111, divertor coils 114, equilibrium field coils 112, TF coils 116, and OH coils 118. The entire sector 110 may be housed in a vacuum can. A section of blankets may also be inserted into the inboard space. The tokamak reactor may be assembled from these modules as illustrated in FIG. 12. When one module needs repair, it can be removed to a hot cell for service. A spare can be rolled into its place. This will greatly enhance the availability of the reactor. The comparison of key values of the conventional external PF and OH system and the modular system is given below in Table 3.

TABLE 3

Comparison of External/Internal PF Systems

|  | Conventional PF Design | Modular Design |
| --- | --- | --- |
| Total PF Current | 59.7 MA | 29.9 MA |
| Total OH Current | 82.5 MA-turns | 21 MA-turns |
| Current Density | 4.0 kA/cm$^2$ | 4 kA/cm$^2$ |
| OH Conductor Width | 30 cm | 1.5 cm |
| Stored Energy in PF System | $8.30 \times 10^8$ j | $2.6 \times 10^8$ j |
| Outplane Force | 16 MN | 7.8 MN |
| Maximum Vertical Field on TF Coil | 2.0 T | 1.5 T |

The total current in the PF is reduced by a factor of two. The OH current is reduced by a factor of four. The OH coil thickness for the conventional design is 30 cm, whereas, for the modular design it is only 1.5 cm. The stored energy is near a factor of four less for the modular design than for the conventional design. The outplane force in the modular system is only half of the external case.

The foregoing description of the preferred embodiments of this invention have been presented for purposes of illustration and description. They are not intended to be exhaustive or to limit the invention to precise the forms disclosed, and obviously many modifications and variations are possible in light of the above teaching. The embodiments where chosen and described in order to better explain the principle of the invention and its practical application to thereby enable others skilled in the art to best utilize the invention in various embodiments and with other modifications as are suited to the particular use contemplated. It is intended that that scope of the invention be defined by the claims depended hereto.

The embodiments of this invention in which an exclusive property or privilege is claimed are defined as follows:

1. In a tokamak reactor including a vacuum vessel, toroidal confining magnetic field coils disposed concentrically around the minor radius of said vacuum vessel, and poloidal confining magnetic field coils, an ohmic heating coil system comprising at least one magnetic coil disposed concentrically around a toroidal field coil, wherein said magnetic coil is wound around said toroidal field coil such that said ohmic heating coil encloses said toroidal field coil.

2. The ohmic heating coil system of claim 1 comprising a plurality of said ohmic heating coils.

3. In a tokamak reactor including a vacuum vessel, toroidal confining magnetic field coils disposed concentrically around the minor radius of said vacuum vessel, and poloidal confining magnetic field coils, an ohmic heating coil system comprising at least one magnetic coil disposed concentrically around a toroidal field coil, wherein said magnetic coil is disposed around the outer perimeter of said toroidal field coil and wherein said toroidal field coil is D-shaped and said magnetic coil is horseshoe-shaped, the opening in said horseshoe-shaped coil being aligned with the first portion of said D-shaped toroidal field coil.

4. An interlocking tokamak reactor module comprising:
 a toroidal vacuum vessel section;
 at least one toroidal field coil disposed concentrically around the minor radius of said vacuum vessel section;
 modular saddle coil means for generating a poloidal confining magnetic field, said saddle coil means disposed circumferentially around the major radius of said toroidal vacuum vessel section and encircling said toroidal field coil about the major radius of said toroidal field coil; and
 modular ohmic heating coil means.

5. The tokamak module of claim 4 wherein said modular ohmic heating coil means comprises an ohmic heating coil having the same general shape as said toroidal field coil and disposed concentrically around said toroidal field coil.

6. The tokamak module of claim 5 wherein said ohmic heating coil is disposed around the outer perimeter of said toroidal field coil.

7. The tokamak module of claim 5 wherein said ohmic heating coil is wound around said toroidal field coil such that said ohmic heating coil encloses said toroidal field coil.

8. The tokamak module of claim 7 wherein said toroidal field coil is D-shaped.

9. The tokamak module of claim 8 wherein said saddle coil means comprises a first set of saddle coils operatively positioned to generate an equilibrium magnetic field and a second set of saddle coils operatively positioned to generate a divertor magnetic field.

10. A tokamak reactor system comprising:
 a plurality of interlocking modules, said modules including a toroidal vacuum vessel section; at least one toroidal field coil disposed concentrically around the minor radius of said vacuum vessel section; modular saddle coil means for generating a poloidal confining magnetic field, said saddle coil means disposed circumferentially around the major radius of said toroidal vacuum vessel section and encircling said toroidal field coil about the major radius of said toroidal field coil; and
 at least one modular ohmic heating coil, said ohmic heating coil including a magnetic coil having the same general shape and concentrically disposed around a toroidal field coil.

11. The system of claim 10 wherein said toroidal field coil is D-shaped and said ohmic heating coil is disposed around the outer perimeter of a toroidal field coil.

12. The tokamak reactor system of claim 11 wherein said ohmic heating coil is horseshoe-shaped, the opening in said ohmic heating coil being aligned with the flat portion of said D-shaped toroidal field coil.

13. The tokamak reactor system of claim 11 comprising a plurality of said ohmic heating coils.

14. The tokamak reactor system of claim 1 wherein said modules include a plurality of toroidal field coils and a plurality of ohmic heating coils and wherein said ohmic heating coils are wound around said toroidal field coils, such that said ohmic heating coils enclose said toroidal field coils.

15. The tokamak reactor system of claim 14 wherein said toroidal coils are D-shaped.

16. The tokamak reactor system of claim 15 wherein said saddle coil means comprise a first set of saddle coils operatively positioned to generate an equilibrium magnetic field, and a second set of saddle coils operatively positioned to generate a divertor magnetic field.

17. The tokamak reactor system of claim 1 further comprising a trimming coil, said trimming coil comprising a conducting ring disposed around the outer circumference of said toroidal field coils

* * * * *